Patented July 2, 1946

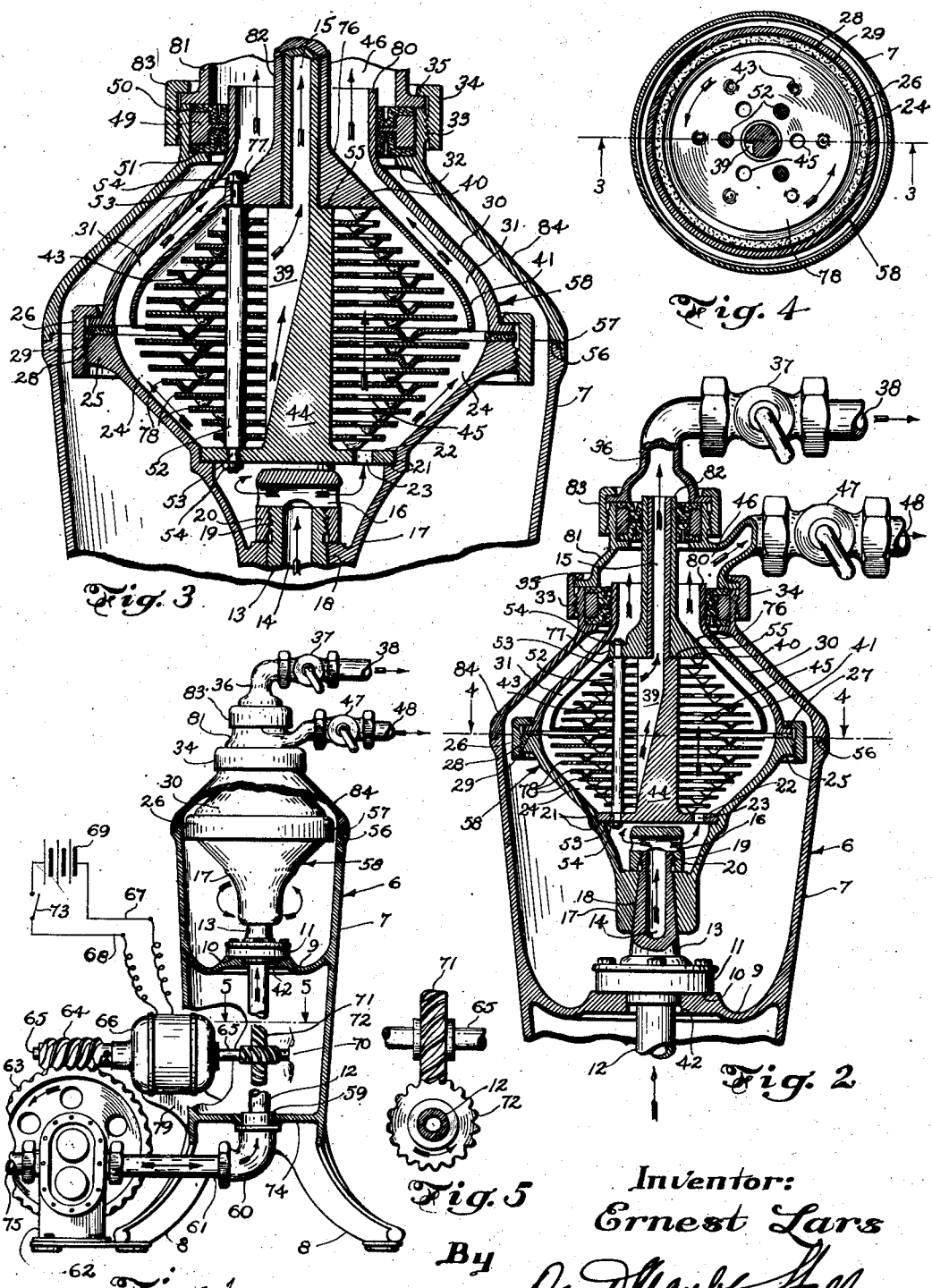

2,403,089

UNITED STATES PATENT OFFICE 2,403,089

CENTRIFUGAL SEPARATOR

Ernest Lars, Melrose Park, Ill.

Application April 30, 1943, Serial No. 485,143

2 Claims. (Cl. 233—21)

This invention relates to separators such as are used in dairies for separating cream from milk; the object of the present invention being to separate the milk into the whey, which is the serum portion of the milk and the more coagulable and thicker part of the milk, or the curd, in the process of cheese making, namely, it is the process of dehydrating the milk to obtain a residue of cheese.

Another object of my invention is to provide a machine of the aforementioned character which is efficient in its operation, and practical in construction, as well as of such simple construction as to lend itself readily for economical production in quantity.

Other objects, advantages, and features resident in my invention may become readily apparent from an examination of the accompanying drawing and the ensuing description, wherein like numerals will be used to designate like parts and in which:

Fig. 1 is a front view, partly in cross-section in order to better illustrate the internal structure of my invention.

Fig. 2 is an enlarged fragmentary longitudinal cross-sectional view of the upper portion of my invention comprising the most vital structure of my said invention.

Fig. 3 is an enlarged longitudinal fragmentary cross-sectional view, similar to Figure 2, taken on the line 3—3 of Figure 4, elucidating more clearly the core structure of my invention and the separator elements which distinguish my invention from the ones used in present type separators used for separating cream from milk.

Fig. 4 is a transversal cross-sectional view on the line 4—4 of Figure 2 shown to a reduced scale.

Fig. 5 is a fragmentary transversal cross-sectional view on the line 5—5 illustrating the spiral gearing transmission used to connect a motive power means with the rotor element comprising my invention.

Referring more particularly to Figure 1, my invention is, generally, designated by the numeral 6 and is comprised of a body 7, having a cap 84 and being joined thereto by virtue of shoulder 56 and bored flange 57, and having legs 8, also further provided with a pedestal suitable for mounting thereon the hydraulic pumping unit 62 which is driven by worm gear 63 receiving its motion from the worm 64 mounted on the shaft 65 of the motor 66. The said motor is mounted on bracket 79 its shaft connected thru suitable conduits 67 and 68 thru a switch 73 to a source of electrical energy 69.

The pumping unit 62 is connected to the body 7 by means of pipe 61 and elbow 60. The said elbow is connected to a flange 74 in the body 7 the said flange being suitably recessed in order to receive a bearing 59 to permit a rotary motion to the hollow sleeve 12 which is further secured by means of a large spindle element 11 having a tapered extension 13, the said spindle element 11 and the extension 13 being bored out to the same size as the tubing element 12 providing the path-way 14 for the milk initially to be passed thru while the said sleeve 12 is in rotary motion. The spindle 11 is rotatably supported on the flange 9 having a machined surface 10 and being suitably bored out at 42 to hold the lower end of spindle 11.

The milk is originally fed in thru the inlet 75. The motor in order to drive the rotor, generally, designated 58 which is secured to the rotating pipe 12, is connected thereto by means of spiral gearing 71 secured firmly to the shaft 65, the companion spiral gear 72 being rigidly mounted on the rotating pipe or sleeve 12.

The tapered extension 18 furnishes suitable frictional gripping for the tapered recess in the lower part of the rotor structure designated 17 and is securely attached thereto by virtue of the nut designated 21 which is suitably threaded at 19 and is provided with a transversal recess 16 meeting the bore 14 so as to permit the liquid to be dispersed thru the said opening 16 in directions to the right and left as indicated by the arrows thus forcing the liquid thru the openings 23 in the flange 22 thence thru openings 45 in plates 78. The flange 22 of the central support 44, is firmly secured in the bored recess 21 and is held in position by virtue of shoulder 40 of the upper clamping member 76, it having several bosses 77, adapted to receive the linking studs 52 which are provided with reduced shoulder portions 53, being threaded and firmly secured by the nuts 54. The central support 44 also has a shoulder portion 55 in order to permit the upper clamping unit 76 to hold the entire assemblage of discs 78 firmly in place. The said discs 78 are suitably bored out at their mid-point and are of progressively varied diameters beginning at the bottom, gradually increasing until they reach the maximum diametral portion interior of the rotor and gradually recede until they are smaller in diameter. The plates or discs 78 are kept separated by virtue of the bump portions 43 which may be depressions as indicated in the said plates and, the plates being further provided with a series of holes 45 thru which the milk will be forced in passing perpendicularly as well as being forced transversally in between the plates in order to help break up the component elements comprising the milk preparatory to separation.

The central support 44 is provided with a segmentary cut of approximately 90° gradually diminishing toward the bottom thus giving it a gradual increase in size in order that it may create the passage 39, which communicates with the passage 14 then continues up out of passage 39 thru duct 15 until it is fed thru the fittings 36, thru the central valve 37, and is collected at the outlet 38. At this outlet, the water dehydrated from the milk is received, it being lighter than the cheese or curd element comprising the milk which would be forced outward in view of the rapid gyration and centrifugal force to which the rotor 58 is to be subjected, the recesses provided in between elements 78 as well as the holes 45 all tending to aid in breaking up the lighter from the heavier elements of the milk.

The rotor 58 is comprised of the lower member 17 being secured to its upper member 30, provided with a flange 27 to meet the flange 25 of the member 17 and having a gasket 29 interposed therebetween. The threaded portion 28 serving to lock the two elements together by virtue of the nut 26, having a flange for retaining the assemblage of elements 17 and 31 when nut 26 is securely tightened in place. The upper portion of the rotor unit designated 80 rotates in a gland formed by the lock-nut 34 having a shoulder portion 35 which clamps the flange on the fitting 81 to the flange 32 by means of the threaded portion 33, having interposed therebetween the stuffing 50 or 51 which may be of a babbit material, or of the usual impregnated felt material so as to furnish a suitable stuffing box or gland intermediate the member 49 tending to keep the stuffing 50 and 51 evenly spaced and under compression when the lock nut 34 is tightened.

A similar stuffing box construction is indicated to house the extension of the inner member 77 in order to keep the separated elements from intermixing prior to their being exhausted from the separator. The said extension 82 operates in a similar stuffing box, the nut 83 and the stuffing elements being of a similar arrangement as provided for the element 81 and the rotor 58.

The operation of this separator machine is as follows: The milk is originally fed in thru the inlet 75, running thru the pump 62, thru the pipe 61 and elbow 60, thru the rotating tube 12, its passage way 14 forcing the said material in an upward direction whereby it is dispersed thru opening 16 and thereby separated so as to follow the path of the arrows, the lighter portion, or the water following along the pathway 39 the heavier material being forced outward by the centrifugal force caused by the rapid rotation and gyration of the rotor, the heavier material being forced to follow thru the passages 24 and 31.

It is to be noted that the upper clamping unit designated 76 is provided with an inverted cup-shaped flange 41 which houses the upper half of the blade elements 78 as it is believed that there might be a tendency of some water to be thrown out and away from the passage 39 and intermixed with the cheese which is being forced out in a rather coagulated mass thru the passages 31. The cheese thus would be forced out into the cavity of fitting 81 and the recesses 46 thereof following thru the pathway of the valve 47, finally to be exhausted at 48.

The separation of cheese or curd of milk from the whey or serum is an operation which requires a greater amount of force, and for this reason the conventional type of separator disc structure cannot be expected to function as it will tend to jam up or clog the separator. For this reason I found it necessary to make horizontal plates and thus facilitate action for separating the very heavy curd to be forced outward yet permit the water to follow the inward path and be exhausted as at 38.

The general form of cream separator would not perform this function; it is this modification of the separator blades or disc elements which I have provided and the method of separating vertically and horizontally which helps break down the physical structure of the milk into its component elements and the heretofore described inverted cup-shaped arrangement 41 protects and acts as a precautionary or safety measure so that after dehydration and before ultimate separation none of the liquid may be accidentally thrown into admixture with the heavier coagulable cheese masses.

I believe I have described rather succinctly the nature and operation of my invention, and inasmuch as it may be susceptible of many modifications, alterations, and improvements, I hereby reserve the right to all such modifications, alterations, and improvements which come within the scope and spirit of the accompanying drawing, the spirit and scope of my invention, or within the purview of the aforementioned description; my invention to be limited only by the subjoined claims.

Having thus described and revealed my invention, what I claim as new and desire to secure by Letters Patent is:

1. A separator comprising, an outer frame, a rotor mounted in said frame adapted to separate the coagulate element from the liquid element components of a fluid passing therethru, rotatable inlet means secured within said frame and connected to said rotor, the said rotor consisting of an upper pear-shaped body casing secured to an inverted lower pear-shaped body casing, the said upper casing rotatably confined in said outer frame and provided with an outlet, a central support having a flange portion secured to a recess within the said lower rotor casing, the said central support further provided with an upright shaft portion having a central opening at its extremity opposite the said flange portion, the said opening communicating with a central passage terminating in an angular passage offset with respect to said central passage opening at the surface of said upright shaft portion, a cup-shaped baffle element secured to the said upright shaft portion and confined within the said upper rotor casing, a multiplicity of flat disc-shaped separator elements of varied perimetral configurations receding in size from the mid portion of said rotor toward each of its ends, the said disc-shaped separator elements being mounted on the said upright shaft portion, the said disc-shaped separator elements further provided with a series of drilled openings in perpendicular registry and a number of bumped portions maintaining the said disc-shaped separator elements in predetermined spaced relationship, and dual exhaust means one branch thereof connected to the said opening in the said upright shaft portion and the remaining branch thereof connected to the said outlet in the said upper pear-shaped casing, the assemblage of the said disc-shaped separator elements and the said cup-shaped baffle element defining an annular pear-shaped passage communicating with one branch of said dual exhaust means, the other branch of said dual exhaust means communicating with the opening and the offset passage in the said upright shaft portion of the said central support.

2. The combination defined in claim 1 further characterized by pump means connected to the said rotatable inlet means, and motive power means connected to the said pump means and to the said rotor the path of travel of the said liquid element being confined to an upward direction, whereas the said coagulate element being confined to an initially upward direction, an intermediate transverse direction, and an ultimate upward direction.

ERNEST LARS.